US012368486B2

(12) United States Patent
Yao et al.

(10) Patent No.: US 12,368,486 B2
(45) Date of Patent: Jul. 22, 2025

(54) SYSTEMS, METHODS, AND APPARATUSES FOR QUASI-CO-LOCATION (QCL) AND SPATIAL RELATION ASSUMPTIONS DURING RANDOM ACCESS PROCEDURES

(71) Applicant: Apple Inc., Cupertino, CA (US)

(72) Inventors: Chunhai Yao, Beijing (CN); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Qiming Li, Beijing (CN); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/766,537

(22) PCT Filed: May 8, 2021

(86) PCT No.: PCT/CN2021/092465
§ 371 (c)(1),
(2) Date: Apr. 5, 2022

(87) PCT Pub. No.: WO2022/236497
PCT Pub. Date: Nov. 17, 2022

(65) Prior Publication Data
US 2024/0057166 A1    Feb. 15, 2024

(51) Int. Cl.
*H04W 74/08* (2024.01)
*H04B 7/06* (2006.01)
*H04W 74/0833* (2024.01)

(52) U.S. Cl.
CPC ...... *H04W 74/0833* (2013.01); *H04B 7/0639* (2013.01)

(58) Field of Classification Search
CPC .... H04B 7/0639; H04B 7/0695; H04B 7/088; H04L 5/0023; H04W 74/0833
See application file for complete search history.

(56) References Cited

U.S. PATENT DOCUMENTS

2013/0044663 A1 * 2/2013 Mohan .............. H04W 74/0858
370/329
2021/0136825 A1    5/2021 Ly et al.
(Continued)

FOREIGN PATENT DOCUMENTS

CN      112400283 A      2/2021
WO      2020068791 A1    4/2020

OTHER PUBLICATIONS

PCT Search Report dated Jan. 19, 2022 in connection with PCT Application No. PCT/CN2021/092465.
(Continued)

*Primary Examiner* — Mansour Oveissi
(74) *Attorney, Agent, or Firm* — Eschweiler & Potashnik, LLC; Matthew W Glause

(57) ABSTRACT

Techniques described herein involve the use of quasi-co-location (QCL) capabilities and spatial relation assumption to enable a UE to designate a single beam for connections with a base station during a physical random access channel (PRACH) procedure. Once the PRACH procedure is complete, the beam may be reset after a pre-determined duration, which may account for decoding latency, or maintained until additional transmission configuration indication (TCI) is received. Also addressed are scenarios involving multiple transmission reception points (TRPs) and switching between beam management schemes based on one or more factors including device capabilities.

18 Claims, 12 Drawing Sheets

(56) References Cited

U.S. PATENT DOCUMENTS

2021/0152234 A1* 5/2021 Zhou ..................... H04B 7/088
2023/0171837 A1* 6/2023 Zhou .................... H04L 5/0053
                                                                370/329

OTHER PUBLICATIONS

PCT Written Opinion dated Jan. 26, 2022 in connection with PCT Application No. PCT/CN2021/092465.
Qualcomm Inc. "Enhancements on Multi-beam Operation" 3GPP TSG RAN WG1 Meeting #102-e R1-2006782; Aug. 28, 2020.
Qualcomm Inc. "draft CR on BWP for CORESET 0 beam reset by RACH" 3GPP TSG-RAN WG1 Meeting #101 R1-2004437; Jun. 5, 2020.
3rd Generation Partnership Project; Technical Specification Group Radio Access Network; NR; Physical layer procedures for data (Release 16); 3GPP TS 38.214 V16.5.0; Mar. 2021.
3rd Generation Partnership Project; Technical Specification Group Radio Access Network; NR; Radio Resource Control (RRC) protocol specification (Release 16); 3GPP TS 38.331 V16.4.0; Mar. 2021.
3rd Generation Partnership Project; Technical Specification Group Radio Access Network; NR; Physical layer procedures for control; (Release 16); 3GPP TS 38.213 V16.5.0 (Mar. 2021); http://www.3gpp.org.

* cited by examiner

SYSTEMS, METHODS, AND APPARATUSES FOR QUASI-CO-LOCATION (QCL) AND SPATIAL RELATION ASSUMPTIONS DURING RANDOM ACCESS PROCEDURES

This application is a National Phase entry application of International Patent Application No. PCT/CN2021/092465 filed May 8, 2021, entitled "SYSTEMS, METHODS, AND APPARATUSES FOR QUASI-CO-LOCATION (QCL) AND SPATIAL RELATION ASSUMPTIONS DURING RANDOM ACCESS PROCEDURES", the contents of which are herein incorporated by reference in their entirety.

FIELD

This disclosure relates to wireless communication networks including techniques for random access procedures of a wireless communication network.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices (e.g., user equipment (UE) and base stations) use wireless resources and establish connections with one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
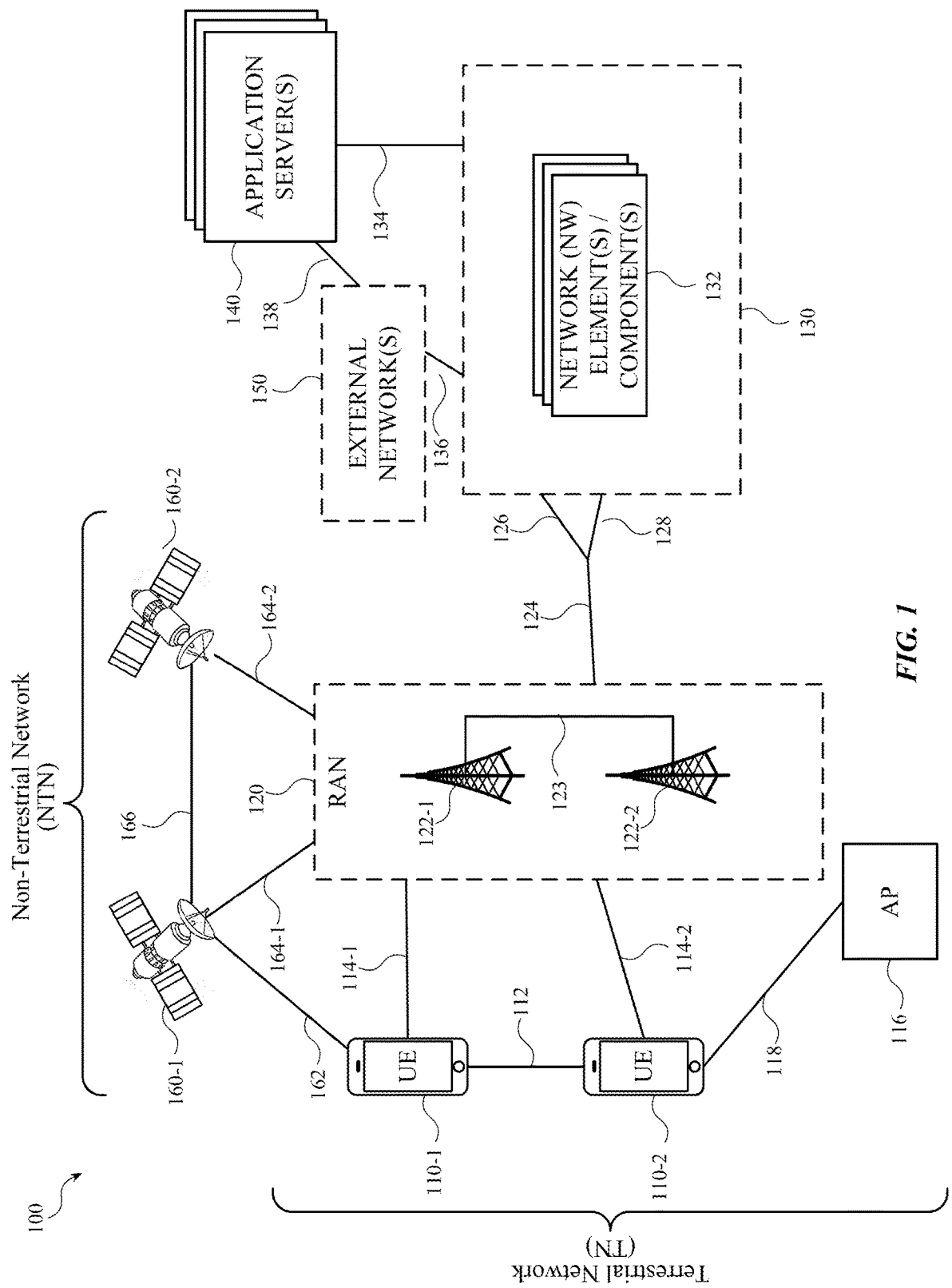
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include one or more types and/or generations of wireless communication networks, such as 4th generation (4G) (e.g., Long-Term Evolution (LTE)) networks, 5th generation (5G) or new radio (NR) networks, etc. Such networks may include user equipment (UEs) and base stations (or other types of radio access network (RAN) nodes that communicate with one another wirelessly. In some implementations, a network may simultaneously implement more than one types of network technology (e.g., 4G and 5G) such that UEs may operate within the network based on 4G technology or 5G technology. An aspect of such networks may include wireless channels, beams, and other wireless resources over which devices may communicate with one another.

A network may implement techniques involving quasi-co-location (QCL), whereby properties or characteristics of one channel/resource may be properly applied to another channel/resource. For example, signals from different antenna ports may be quasi-co-located with respect to one another if channel conditions between the signals are such that the properties of one channel/resource, over which a symbol on one antenna port is conveyed, can be inferred from the channel/resource over which a symbol on the other antenna port is conveyed. For example, reference signals (RSs) A and B may share QCL when each signal is transmitted by the same transmission reference point (TRP) (e.g., antenna array) applying the same spatial filter (e.g., the beam for each signal corresponds to the same or similar direction, shape, beam power, etc.). As such, since RSs A and B may be subject to similar channel conditions and have similar channel properties, a UE receiving RS A may use the channel properties of RS A to detect RS B. Channel properties that may relate to QCL may include doppler shift (e.g., is a shift in a wavelength of a radio wave relative to motion of a receiver), doppler spread or fading rate (e.g., a difference between signal frequency between a transmitter (Tx) point and receiver (Rx) point), average signal delay, delay spread, and spatial reception parameters (e.g., the same or similar spatial filter).

A base station may indicate channels or signals that share QCL in one or more ways. For example, a downlink QCL indication may be based on a transmission configuration indication (TCI), and a UE may use QCL to derive Rx beam related information based on the TCI. An uplink beam indication may be provided based on spatial relationship information of a sounding reference signal (SRS) or physical uplink control channels (PUCCH). A TCI may be provided to a UE on a per-resource basis (e.g., control resource set (CORESET), physical downlink (DL) shared channel (PDSCH), channel state information reference signals (CS-RS) resource, etc.), and may be included in downlink control information (DCI) from a base station.

A TCI may be provided to a UE on a per-resource basis (e.g., control resource set (CORESET), physical downlink (DL) shared channel (PDSCH), channel state information reference signals (CS-RS) resource, etc.), and may be included in downlink control information (DCI) from a base station. The TCI may include a unified TCI, which may configure uplink (UL) TCI or DL TCI, or joint UL/DL TCI. DL TCI may be used to provide downlink beam indication for multiple unicast channels for multiple component carriers (CCs), e.g., all CORESETs, PDSCH, etc. UL TCI may be used to provide an uplink beam indication for multiple unicast channels for multiple CCs, physical uplink control channels (PUCCH), physical uplink shared channels (PUSCH), sounding reference signal (SRS), etc. And joint UL/DL TCI may be used to provide the beam indication for both UL and DL TCI.

A CORESET may include a set of physical resources (e.g., a specific area on a DL resource grid) and a set of parameters that is used to carry physical downlink control channel (PDCCH) information and/or DL control information (DCI); the number of CORESETs within a carrier bandwidth (CBW) depends on how many CORESETs/Search Spaces correspond to a bandwidth part (BWP) and how many BWPs correspond to the CBW; and a search space may be an area within a CORESET that UE should monitor to detect a specific PDCCH/DCI. Additionally, TCI may contain parameters for QCL relationships between DL RSs, demodulation reference signal (DMRS) ports of a physical downlink shared channel (PDSCH), DMRS ports of a PDCCH, or channel status indicator reference signal (CSI-RS) ports of CSI-RS resources, etc.

A UE receiving the TCI may determine QCL information for a related resource, such as a Rx beam that the UE may use to communicate back to base station 122. In some scenarios, the base station may provide downlink (DL) TCI, which may be used to indicate DL beam information for multiple unicast channels involving multiple component carriers (CCs) (e.g., all CORESETs), PDSCHs, etc. In other scenarios, the base station may provide UL TCI, which may be used to indicate UL beam information for multiple unicast channels involving multiple CCs, a PUCCH, a PUSCH, an SRS, etc. And in yet other scenarios, the base station may provide UL/DL TCI, which may be used to provide beam indications or information for both UL and DL resources.

Applying QCL techniques and unified TCI information to a UE during a random access (RA) procedure (e.g., a physical random access channel (PRACH) procedure) may involve the following operations. A UE may initiate a PRACH procedure by sending a random access request message (e.g., Msg1) to a base station, and the base station may respond with a random access response (RAR) message (e.g., Msg2). The UE may apply a beam associated with the PRACH procedure to a CORESET (e.g., CORESET0) associated with the RAR message or RA search space. For other CORESETs, the UE may still maintain beams indicated by TCI information from the base station, such that the UE is maintaining a beam for the PRACH and one or more additional beams based on TCI information.

The UE may respond to the RAR message by transmitting a connection request message (e.g., Msg3) using timing information and PUSCH radio resources allocated by a UL Grant specified by the RAR message. After the UE transmits Msg3, the UE may apply the beam associated with the PRACH procedure to all CORESETs (e.g., CORESET1, CORESET2, etc.) to receive the PRACH message (e.g., Msg4), and promptly after the UE receives Msg4, the UE may reset the beam for the CORESETs other than the PRACH CORESET (e.g., CORESET0) to be the one indicated by TCI information. As such, currently available techniques involving QCL and spatial relation assumptions during PRACH procedures may include certain limitations. For example, a UE may be expected to maintain multiple beams during a PRACH procedure, which may exceed a capability of the UE to do so. Additionally, a decoding latency of the UE may prevent the UE from switching a beam from one CORESET to another CORESET by the anticipated by the network (e.g., after a decoding of Msg4 at the end of a RA procedure).

Techniques, described herein, may be implemented to address the issues mentioned above and/or provide one or more additional benefits by, for example, specifying an appropriate UE QCL and spatial relation assumption for PRACH procedure and connected mode communications based on a unified TCI framework. For example, in some implementations, after a UE sends a first PRACH message (e.g., Msg1), the UE may apply the beam associated with first PRACH message to a subset of, or all DL/UL, channels (e.g., PDCCHs, PDSCHs, SRSs, PUCCHs), PUSCH, etc.). Additionally, K symbols or slots after the PRACH procedure, the UE may reset the beam for the channels to be the one indicated by a unified TCI. In another example, after a UE sends a first PRACH message (e.g., Msg1), the UE may apply the beam associated with the PRACH procedure to a subset of, or all, DL/UL channels (e.g., PDCCHs, PDSCHs, SRSs, PUCCHs), PUSCH, etc.), and the UE may continue to use the beam associated with the PRACH procedure until the base station provides a TCI to do otherwise.

In yet another example, whether to apply the beam associated with the PRACH procedure to a subset of, or all, DL/UL channels after K symbols or slots, or in response to TCI from the base station, may be determined based on the type of PRACH procedure performed. For instance, when the PRACH is used for scheduling request, the UE may apply the beam for the corresponding DL/UL channels in response to TCI from base station. Additionally, or alternatively, whether to apply the beam associated with the PRACH procedure to a subset of, or all, DL/UL channels after K symbols or slots, or in response to TCI from the base station, may be determined based on the type of DL RS (e.g., a CSI-RS) associated with PRACH. In still further examples, whether to apply the beam associated with the PRACH procedure to a subset of, or all, DL/UL channels after K symbols or slots, or in response to TCI from the base station, may be determined based on an indication or instruction from the base station (e.g., an RRC message which may include a suitable RRC parameter, a 1-bit indicator of a Msg4, etc.) which may be based on, or in response to, capability information provided to the base station by the UE.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network nod 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2)

protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, $L=1, 2, 4, 8,$ or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
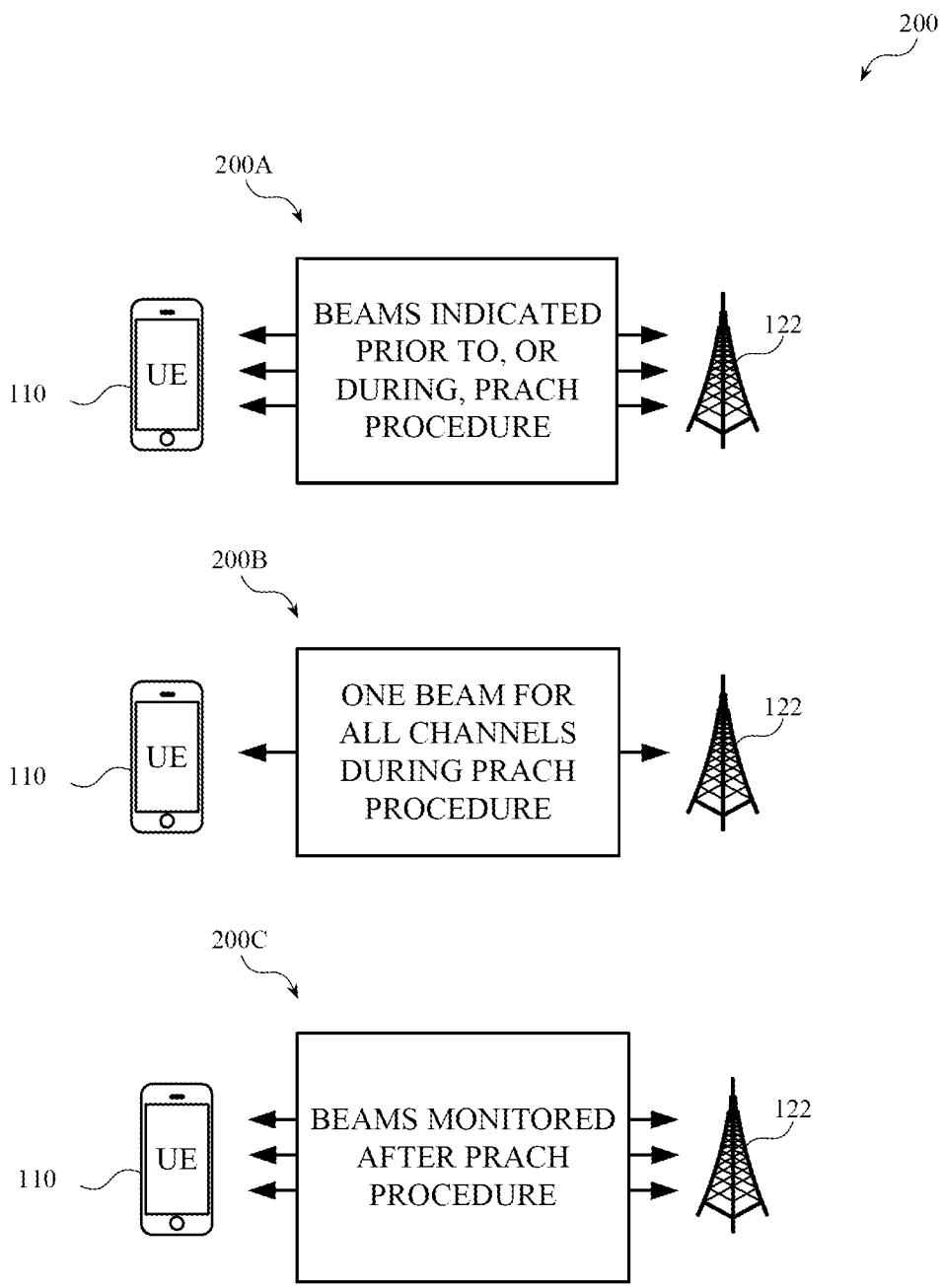
FIG. 2 is a diagram of an example overview of techniques described herein.

FIG. 2 is a diagram of an example 200 and general overview of techniques described herein. As shown, multiple beams 200A may be indicated or available to UE 110 and base station 122 through TCI information received prior to, and or during, a PRACH procedure. However, during the PRACH procedure, UE 110 and base station 122 may only maintain one beam 200B for all communications channels between UE 110 and base station 122. And after the PRACH procedure is completed, the PRACH beam may be reassigned to one or more channels and/or additional beams may be maintained between UE 110 and base station 122. Additional descriptions and details are provided below with reference to corresponding figures.

Figure 3:
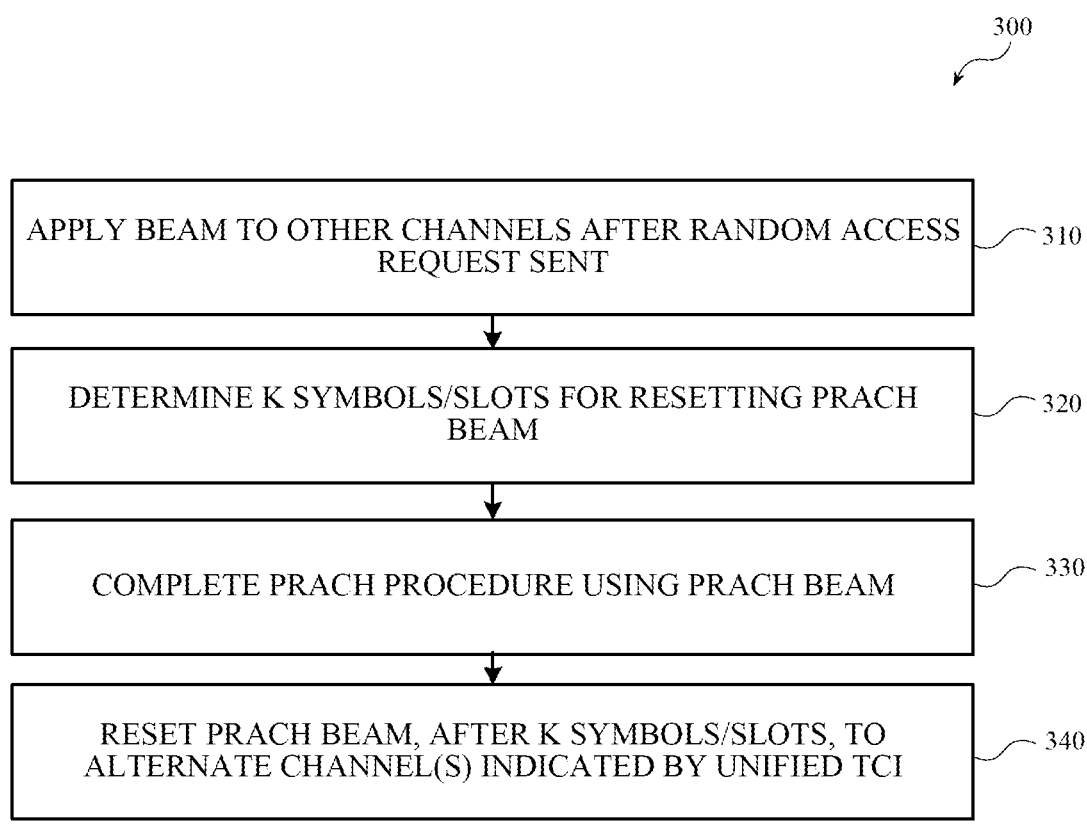
FIG. 3 is a diagram of an example of a process for resetting a beam, used for a PRACH procedure, based on unified TCI.

FIG. 3 is a diagram of an example of a process 300 for resetting a beam used for a PRACH procedure. Process 300 may be implemented by a UE. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., base station 112).

As shown, process 300 may include, after a random access request (e.g., Msg1) is sent, applying a beam to all channels (block 310). For example, UE 110 may initiate an PRACH procedure by using a beam to communicate a random access request message to a base station 122. The request may be sent in accordance with a particular CORESET configured for communicating such messages to the base station. In some implementations, the CORSET may correspond to a CORESET associated with a random access search space. After sending the message, UE 110 may apply the beam to a subset of, or all, DL and/or UL signals or channels between the UE 110 and base station 122, such as a PDCCH, PDSCH, SRS, PUCCH, PUSCH, etc. In some implementations, this may alleviate UE 110 of monitoring other beams (e.g., beams indicated by TCI) during the PRACH procedure. In some implementations, UE 110 may also, or alternatively, apply the beam to channels in the same component carrier (CC). Additionally, or alternatively, UE 110 may apply the beam to channels across CCs in a band or band group. In so doing, UE 110 may therefore receive communicate with the base station over any channel with having to maintain beams beyond a beam capacity of UE 110.

Process 300 may include determining K symbols/slots for resetting PRACH beam (block 350). For example, UE 110 may determine K symbols/slots for changing or reassigning the beam used for the PRACH procedure to one or more other channels. The unified TCI may have been received by UE 110 prior to, or during, the PRACH procedure. In some implementations, UE 110 may determine the K symbols based on based on subcarrier spacing of a DL BWP and/or UL BWP. In other implementations, UE 110 may determine the K symbols based on a minimal subcarrier spacing between DL BWP and UL BWP.

Process 300 may also include completing the PRACH procedure using the PRACH beam (block 330). For example, UE 110 may receive a RAR message (e.g., Msg2) from the base station, and, if required communicate further by sending a UL scheduled transmission message (Msg3) and receiving a contention resolution message (Msg4). In doing so, UE 110 may use the same beam associated with the PRACH procedure (e.g., the beam used to send the random access request message (Msg1) to the base station.

Process 300 may include, resetting the PRACH beam, after K symbols/slots, to channels indicated by unified TCI (block 340). For example, after the PRACH procedure is complete, UE 110 may reset or reassign the beam used to complete the PRACH procedure to alternative channels indicated by the unified TCI. In some embodiments, the alternative channels are different than those used for the PRACH procedure.

Figure 4:
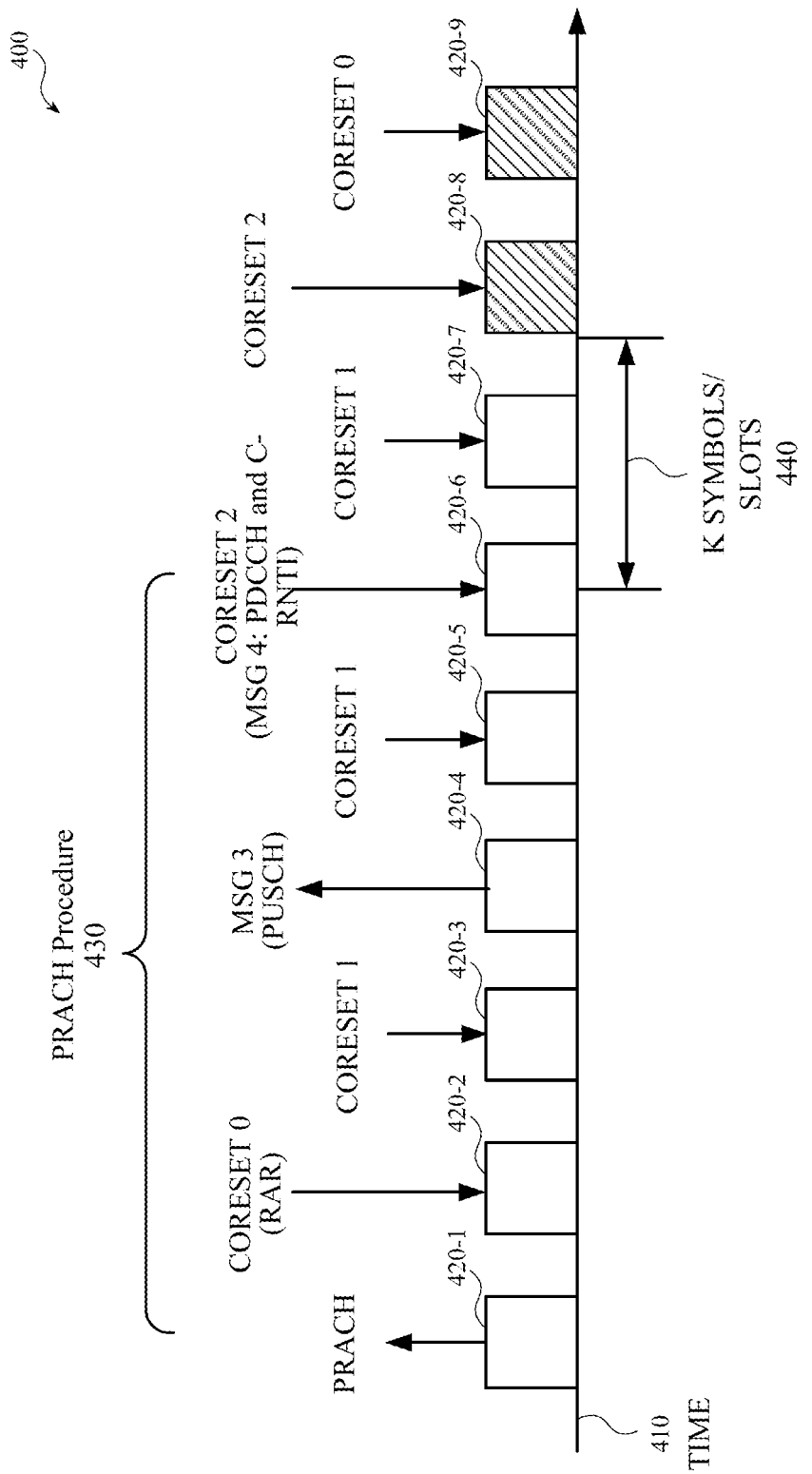
FIG. 4 is a diagram of an example of managing beams relative to a PRACH procedure.

FIG. 4 is a diagram of an example 400 of managing beams relative to a PRACH procedure. As shown, FIG. 4 includes a timeline 410 consisting of events 420-1, 420-2, through 420-9 representing beams associated with messages, CORESETs, and channels. Example 400 may describe a scenario in which UE 110 is not encumbered by maintaining multiple beams unnecessarily and in which a duration of K symbols/slots 440 may be implemented to ensure UE 110 may reassign a PRACH beam without missing communications involving base station 122.

UE 110 may use a beam to initiate a PRACH procedure 430 with base station 122 (at 420-1). After initiating the PRACH procedure, UE 110 may apply the beam used to initiate the PRACH procedure to all channels (e.g., PDCCH, PDSCH, SRS, PUCCH, PUSCH, etc.) for the duration of the PRACH procedure. As such, UE 110 may maintain only one beam during the entire PRACH procedure involving multiple CORESETs (e.g., event 420-1 through 420-6) even if, for example, another beam was indicated by a TCI from the base station. Upon communicating PRACH Msg4 (PDCCH and C-RNTI), UE 110 may continue using the PRACH beam for events (e.g., event 420-7) until a duration equal to K slots/symbols 440, measured from the transmission of Msg4 has expired (at event 420-8). Thereafter, UE 110 may apply or switch the PRACH beam to one on or more other channels and CORESETs based on a unified TCI or other TCI information received from the base station (at 420-8 and 420-9).

Figure 5:
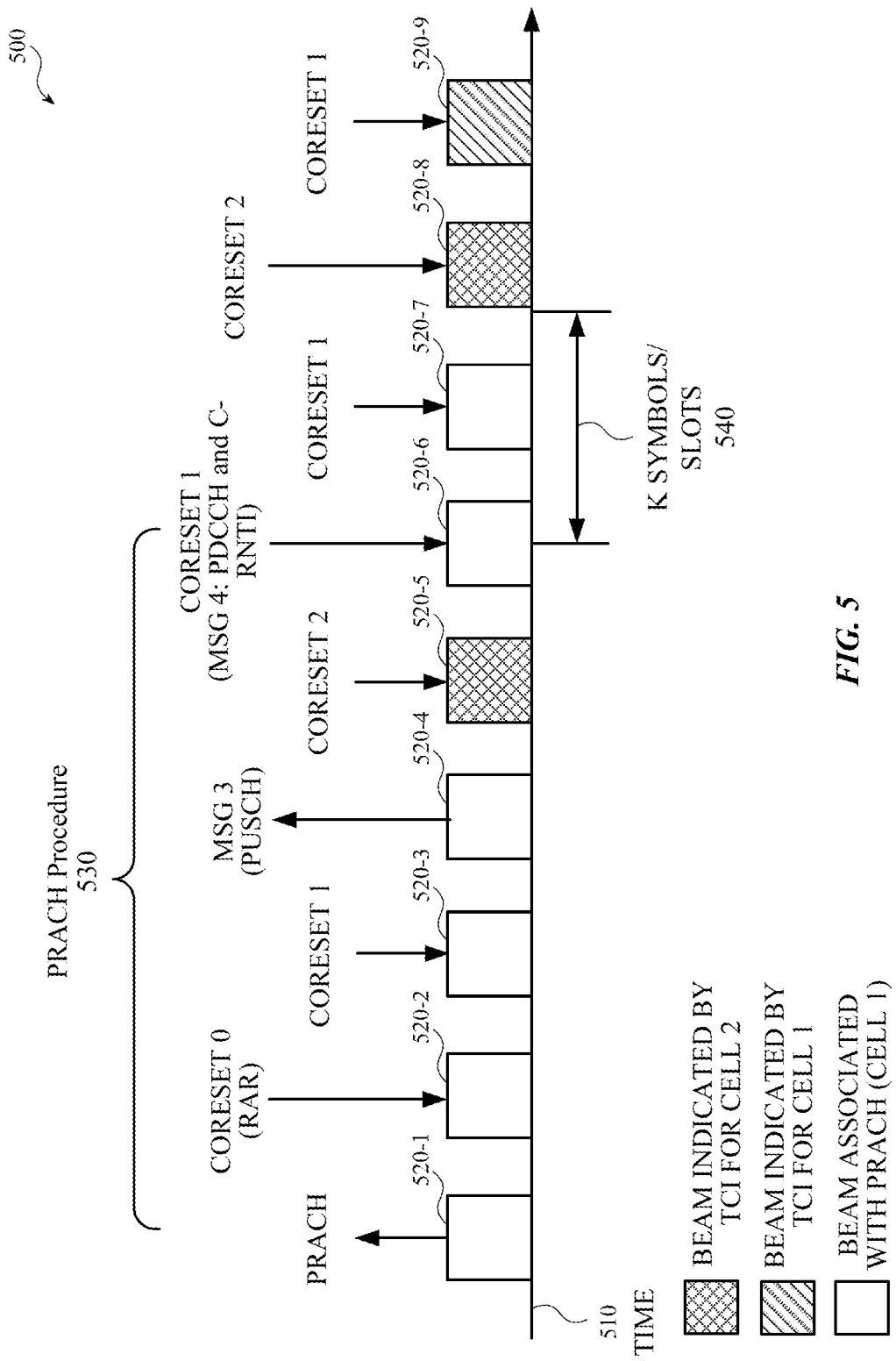
FIG. 5 is a diagram of an example of managing beams, from different cells, relative to a PRACH procedure.

FIG. 5 is a diagram of an example 500 of managing beams, from different cells, relative to a PRACH procedure. As shown, FIG. 5 includes a timeline 510 consisting of events 520-1, 520-2, through 520-9 representing beams associated with messages, CORESETs, and channels. Example 500 may describe a scenario in which UE 110 may maintain beams for different cells during the PRACH procedure and in which a duration of K symbols/slots 540 may be implemented to ensure UE 110 may reassign a PRACH beam without missing communications after the PRACH procedure 530.

UE 110 may receive TCI information from different cells, which may include different base stations 122 and/or other types of transmission/reception points (TRPs). In some implementations, one or more (or both) cells may provide UE 110 with information indicating which UL/DL channels are associated with which cell. The information may be provided via one or more types of higher layer signaling, such as a RRC message, a MAC control element (CE), DCI, etc.). UE 110 may maintain a beam for each cell. In some implementations, the information may include a cell ID, TCI state, and DL/UL channel for each base station. In some implementations, one or more of the base stations may configure a cell/TRP index for a CSI-RS (e.g., by indicating the TCI associated with a cell for the CSI-RS).

As shown, UE 110 may use a beam to initiate a PRACH procedure (at 520-1) with one of the cells. Assume that the PRACH procedure involves cell 1 instead of cell 2. UE 110 may proceed with the PRACH procedure by communicating with cell 1. In some implementations, UE 110 may be configured to limit the number of beams for cell 1 to a single beam (e.g., even if UE 110 receives TCI information to the contrary) for the duration for the PRACH procedure. Additionally, or alternatively, UE 110 may maintain a beam for cell 2 throughout the PRACH procedure. The beam for each cell may be applied to all channels corresponding to that cell (e.g., PDCCH, PDSCH, SRS, PUCCH, PUSCH, etc.) for the duration of the PRACH procedure. As such, UE 110 may maintain only one beam during the entire PRACH procedure for each cell (e.g., event 520-1 through 520-6) even if, for example, another beam was indicated by a TCI from the base station. In some implementations, UE 110 may maintain multiple beams for one or more of the cells. Upon communicating PRACH Msg4 (PDCCH and C-RNTI), UE 110 may continue using the PRACH beam for cell 1 for events (e.g., event 520-7) until a duration equal to K slots/symbols, measured from the transmission of Msg4 has expired (at event 520-8). Thereafter, UE 110 may apply or switch the PRACH beam for cell 1 to one on or more other channels and CORESETs based on TCI information (e.g., a unified TCI) which may have been received at an earlier point. The beam for cell 2 may remain the same unless, for example, new TCI information for cell 2 had been received by UE 110 in which case UE 110 may update the beam for cell 2 as well.

Figure 6:
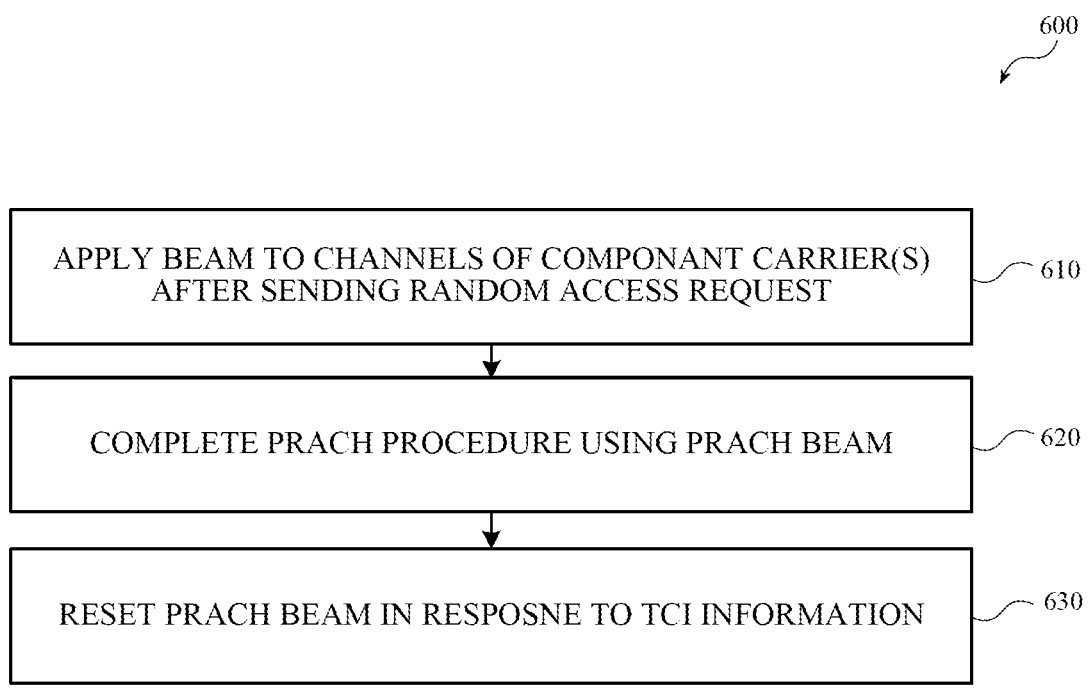
FIG. 6 is a diagram of an example of a process for resetting a beam, used for a PRACH procedure, based on unified TCI.

FIG. 6 is a diagram of an example of a process 600 for resetting a beam, used for a PRACH procedure, based on unified TCI. Process 600 may be implemented by a UE. In some implementations, some or all of process 600 may be performed by one or more other systems or devices, including one or more of the devices of FIG. 1. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600. As such, the techniques described herein are not limited to a number, sequence, arrangement, timing, etc., of the operations or process depicted in FIG. 6. Additionally, while process 600 may be described from the perspective one a particular device (e.g., UE 110) within a network, the techniques described herein also include corresponding operations performed by a corresponding device (e.g., base station 112).

Process 600 may include, after a random access request (e.g., Msg1) is sent, applying a beam to all channels associated with component carriers (block 610). For example, UE 110 may use multiple component carriers to communication with base station 112. UE 110 may initiate a PRACH procedure by using a beam to communicate a random access request message to a base station 122. The request may be sent in accordance with a particular CORESET configured for communicating such messages to base station 122. In some implementations, the CORSET may correspond to a CORESET associated with a random access search space. After sending the message, UE 110 may apply the beam to a subset of, or all, DL and/or UL signals or channels corresponding to the component carriers between the UE 110 and base station 122, such as a PDCCH, PDSCH, SRS, PUCCH, PUSCH, etc. In some implementations, this may alleviate UE 110 of monitoring other beams (e.g., beams indicated by TCI) during the PRACH procedure.

In some implementations, UE 110 may only apply the PRACH beam to channels in the same CC. In some implementations, UE 110 may apply the PRACH beam to channels across CCs in a band and/or band group, which may be similar to the CCs to apply a unified TCI. In some implementations, before applying the PRACH beam to channels of one or more CCs, UE 110 and/or base station 122 may determine whether, or to what extent channels of one or more CCs are to be combined. For example, whether UE 110 is to apply the PRACH beam to channels in the same CC, channels across CCs of a band, or channels across CC in a band group may depend on a capability of UE 110 and/or signaling (e.g., higher layer signaling) from base station 122. In some implementations, UE 110 may be configured to make such a determination without communicating with base station 122, while in other implementations, UE 110 may provide base station 122 with one or more types of information (e.g., UE capability information), base station 122 may process the information to make an appropriate determination, and/or may respond to UE 110 with instructions consistent with the determination.

Process 600 may include completing the PRACH procedure using the PRACH beam (block 620). For example, UE 110 may receive a RAR message (e.g., Msg2) from the base station, and, if required communicate further by sending a UL scheduled transmission message (Msg3) and receiving a contention resolution message (Msg4). In doing so, UE 110 may use the same beam associated with the PRACH procedure (e.g., the beam used to send the random access request message (Msg1) to the base station.

Process 600 may include resetting the PRACH beam in response to receiving TCI information (BLOCK 630). For example, after completing the PRACH procedure, UE 110 may continue communicating with base station 122 using the same beam use to perform the PRACH procedure. At some point, UE 110 may receive TCI information from base station 122. The TCI information may be included in DCI or another type of signaling from base station 122. In response to the TCI information, UE 110 may resent, update, or reapply the beam to the CCs, channel(s) and/or CORESET (S)

In some implementations, base station 122 may provide UE 110 with CSI-RS information for tracking TRSs and support fine time/frequency offset tracking. In some implementations, the TRS information may be provided by higher layer signaling (e.g., RRC messaging, a MAC CE, DCI, etc.). In some implementations, QCL may be applied to the TRS information, with the synchronization signal block (SSB) associated with the PRACH procedure, for time/frequency offset tracking (e.g., to provide QCL-TypeA assumption). In some implementations, the TRS may be indicated to UE 110, by base station 122, via a PRACH Msg4, which may include, for example, a TRS resource ID (or TRS resource set ID). In some implementations, after the PRACH procedure, the beam for the currently configured TRS in the unified TCI state, or all configured TRS, may be updated to be based on the beam associated with PRACH. UE 110 may continue to use the TRS for fine time/frequency offset tracking.

Figure 7:
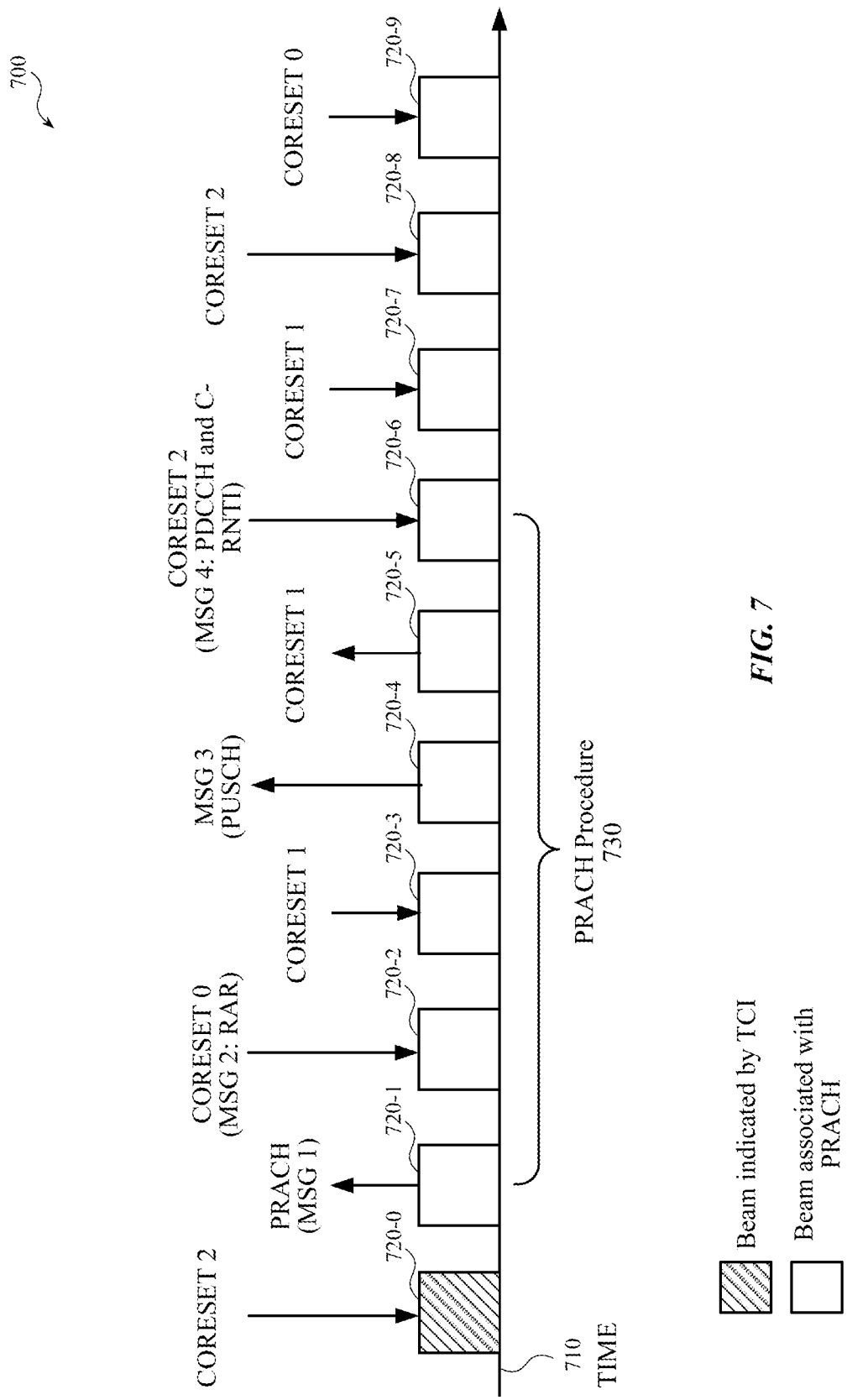
FIG. 7 is a diagram of an example of managing beams relative to a PRACH procedure.

FIG. 7 is a diagram of an example 700 managing beams relative to a PRACH procedure. As shown, FIG. 7 includes a timeline 710 consisting of events 720-1, 720-2, through 720-9 representing beams associated with messages, CORESETs, and channels. Example 700 may describe a scenario in which UE 110 is to use a single beam to complete a PRACH procedure 730 and reassigns the beam in response to new TCI information.

UE 110 may receive TCI information (at 720-1) prior to initiating a PRACH procedure (at 720-2) by communicating a random access request (Msg1) to base station 122. In some implementations, UE 110 may communicate with base station using one or more CCs. After sending the random access request, UE 110 may apply the beam associated with PRACH to the channels in the same CC. In some implementations, UE 110 may instead apply the beam associated with PRACH to the channels across CCs in a band or band group, which is similar to the CCs to apply the unified TCI. Yet in other implementations, UE 110 may determine whether to apply the beam to the channels in the same CC or to the channels across CCs in a band or band group based on higher layer signaling (from base station 122) which may include UE 110 reporting a capability of UE 110 for using CCs, maintaining multiple beams, or reported by UE capability, and/or one or more other types of UE capability information. In some implementations, UE 110 may wait to reassign or otherwise reapply the beam to one or more other CCs and channels until new TCI information received from base station 122.

Figure 8:
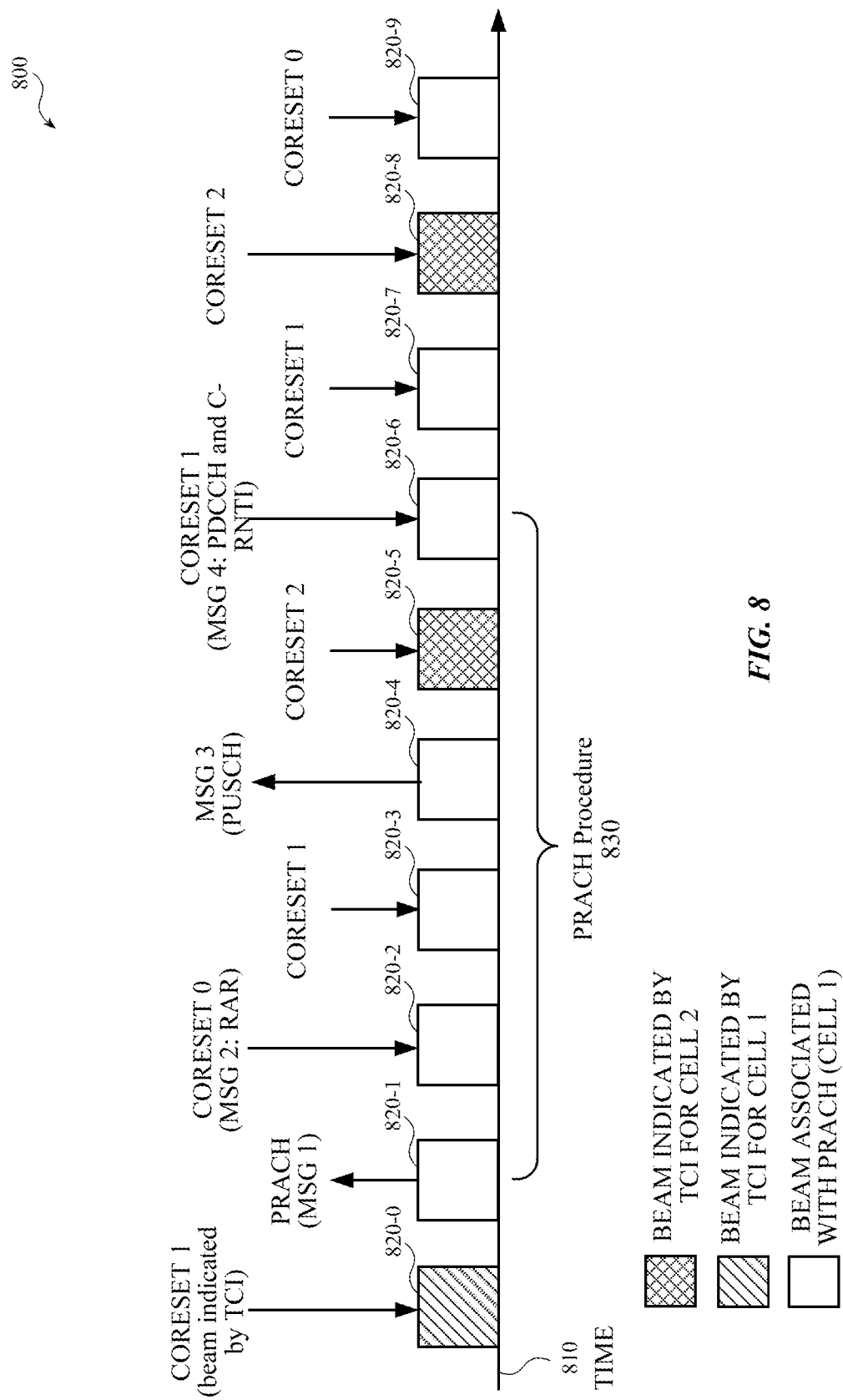
FIG. 8 is a diagram of an example of managing beams, from different cells, relative to a PRACH procedure.

FIG. 8 is a diagram of an example 800 of managing beams, from different cells, relative to a PRACH procedure. As shown, FIG. 8 includes timeline 810 consisting of events 820-0, 820-1, through 820-9, representing beams associated with messages, CORESETs, and channels. Example 800 may describe a scenario in which UE 110 may maintain beams for different cells during the PRACH procedure and reassigns the beam in response to new TCI information.

UE 110 may receive TCI information from different cells, which may include different base stations 122 and/or other types of transmission/reception points (TRPs). In some implementations, one or more (or both) cells may provide UE 110 with information indicating which UL/DL channels are associated with which cell. The information may be provided via one or more types of higher layer signaling, such as a RRC message, a MAC control element (CE), DCI, etc.). UE 110 may maintain a beam for each cell. In some implementations, the information may include a cell ID, TCI state, and DL/UL channel for each base station. In some implementations, one or more of the base stations may configure a cell/TRP index for a CSI-RS (e.g., by indicating the TCI associated with a cell for the CSI-RS).

UE 110 may receive TCI information (at 820-0) prior to initiating a PRACH procedure (at 820-1). Assume that the PRACH procedure involves cell 1 instead of cell 2. UE 110 may proceed with the PRACH procedure by communicating with cell 1. In some implementations, UE 110 may be configured to limit the number of beams for cell 1 to a single beam (e.g., even though UE 110 received TCI information earlier) for the duration for the PRACH procedure. Additionally, or alternatively, UE 110 may maintain a beam for cell 2 throughout the PRACH procedure. Thus, at event 820-8, UE 110 may receive a communication from cell 2, but all communications with cell 1 involve the PRACH beam. The beam for each cell may be applied to all channels corresponding to that cell (e.g., PDCCH, PDSCH, SRS, PUCCH, PUSCH, etc.) for the duration of the PRACH procedure. As such, UE 110 may maintain only one beam for each cell during the entire PRACH procedure (e.g., events 820-1 through 820-6). After the PACH procedure is compete (at 820-6) UE 110 may continue using the same beams for each cell until new or updated TCI information is received from either cell 1 or cell 2.

Figure 9:
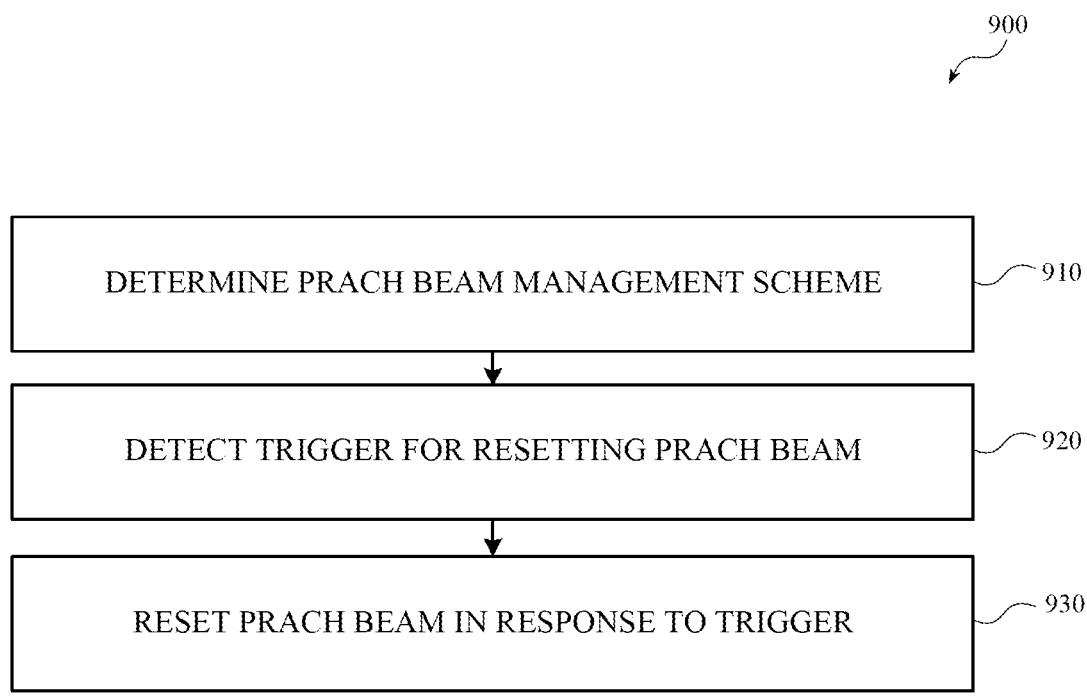
FIG. 9 is a diagram of an example of a process for determining a beam management technique for a PRACH procedure.

FIG. 9 is a diagram of an example of a process 900 for determining a beam management technique for a PRACH procedure. Process 900 may be implemented by UE 110. In some implementations, some or all of process 900 may be performed by one or more other systems or devices, including one or more of the devices of FIG. 1. Additionally, process 900 may include one or more fewer, additional, differently ordered and/or arranged operations than those shown in FIG. 9. In some implementations, some or all of the operations of process 900 may be performed independently, successively, simultaneously, etc., of one or more of the other operations of process 900. As such, the techniques described herein are not limited to a number, sequence, arrangement, timing, etc., of the operations or process depicted in FIG. 9. Additionally, while process 900 may be described from the perspective one a particular device (e.g., UE 110) within a network, the techniques described herein also include corresponding operations performed by a corresponding device (e.g., base station 112).

As shown, process 900 may include determining a trigger for resetting a PRACH beam (block 910). For example, UE 110 may determine a PRACH beam management scheme. A PRACH beam management scheme may include one or more of the techniques or operations described herein, such as those described above with reference to one or more of FIGS. 3-8. In some implementations, UE 110 may determine which PRACH beam management scheme to implement based on a type of random access procedure being implemented (e.g., a contention based random access (CBRA) procedure or contention free random access (CFRA) procedure. For example, if the random access procedure is a CBRA procedure, UE 110 may implement a technique consistent with one or more of FIGS. 3-5, which may involve the use of K symbols/slots, otherwise UE 110 may implement a technique consistent with one or more of FIGS. 6-8, which may involve waiting for TCI information after the random access procedure is completed. Alternatively, if the random access procedure is a CBRA procedure, UE 110 may implement a technique consistent with one or more of FIGS. 6-8, which may involve waiting for TCI information after the random access procedure is completed, otherwise UE 110 may implement a technique consistent with one or more of FIGS. 3-5, which may involve the use of K symbols/slots.

Additionally, or alternatively, UE 110 may determine which PRACH beam management scheme to implement based on a type of DL RS associated with the PRACH. For example, if the PRACH is associated with a CSI-RS, UE 110 may implement a technique consistent with one or more of FIGS. 3-5, which may involve the use of K symbols/slots, and otherwise, UE 110 may implement a technique consistent with one or more of FIGS. 6-8, which may involve waiting for TCI information after the random access procedure is completed. In some implementations, UE 110 may also, or alternatively, determine which PRACH beam management scheme to implement (or be configured to determine a trigger for resetting a PRACH beam) based on one or more communications from base station 122. For example, in some implementations, UE 110 may receive such instructions or indications from base station 122 via an RRC message or signaling, a Msg4 PDCCH communication, etc.). In some implementations, for example, a Msg4 PDCCH may include an indicator, such as a 1-bit indicator, to indicate which PRACH beam management scheme to implement. In yet other implementations, base station 122 may use a RRC message to indicate, configure, or otherwise cause UE 110 to engage in determining which PRACH beam management scheme to implement, including which criteria to use in make the determination (e.g., random access procedure type, communication from base station 122, etc.).

Process 900 may include detecting a trigger or condition for resetting the PRACH beam (block 920). For example, UE 110 may detect a trigger or condition for resetting the PRACH beam. The trigger or condition may be based on the type of PRACH beam management scheme has been determined and implemented by UE 110. In some implementations, for example, the trigger may be an end of K symbols/slots measured from a completion (e.g., reception of Msg4) of the random access procedure. In some implementations, the trigger may be UE 110 receiving new TCI information from base station 122 after completion (e.g., reception of Msg4) of the random access procedure.

Process 900 may include resetting the PRACH beam in response to the trigger (block 930). For example, UE 110 may reassign the beam used for connecting to base station 122 during the PRACH procedure to one or more alternative CORESETs or connections. In some implementations, the alternative CORESETs or connections may be indicated to UE 110 by base station 122 via TCI information received before the PRACH procedure began or after the PRACH procedure has been completed.

Figure 10:
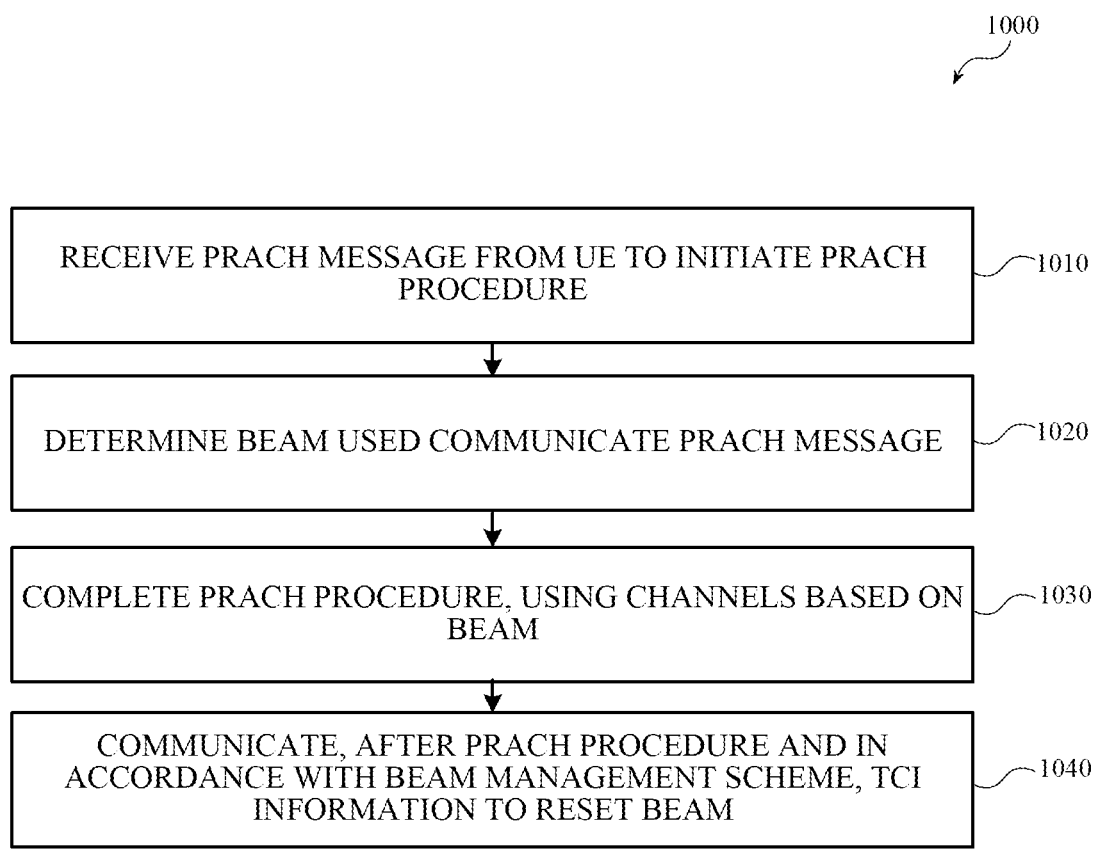
FIG. 10 is a diagram of an example of a process for resetting a beam, used for a PRACH procedure, based on unified TCI.

FIG. 10 is a diagram of an example of a process 1000 for resetting a beam, used for a PRACH procedure, based on unified TCI. Process 1000 may be implemented by base station 122. In some implementations, some or all of process 1000 may be performed by one or more other systems or devices, including one or more of the devices of FIG. 1. Additionally, process 900 may include one or more fewer, additional, differently ordered and/or arranged operations than those shown in FIG. 10. In some implementations, some or all of the operations of process 1000 may be performed independently, successively, simultaneously, etc., of one or more of the other operations of process 1000. As such, the techniques described herein are not limited to a number, sequence, arrangement, timing, etc., of the operations or process depicted in FIG. 10. Additionally, while process 1000 may be described from the perspective one a particular device (e.g., base station 122) within a network, the techniques described herein also include corresponding operations performed by a corresponding device (e.g., UE 110).

Process 1000 may include receiving a PRACH message to initiate PRACH procedure (block 1010). For example, base station 122 may receive a PRACH message (e.g., Msg1) from UE 110 that initiates a PRACH procedure between base station 122 and UE 110. In some implementations, base station 122 may have already communicated TCI information (e.g., a unified TCI) to UE 110. The TCI information may have indicated beam information (e.g., a beam) that UE 110 may use to communicate with base station 122.

Process 1000 may include determining the beam used to communicate the PRACH message (block 1020). For example, base station 122 may determine a beam used by UE 110 to communicate a PRACH message to base station 122. In some implementations, the beam may have been indicated to UE 110 previously (by base station 122) via TCI information (e.g., a unified TCI). In some implementations, the beam may be the product of UE 110 apply QLC techniques to signals received from base station 122.

Process 1000 may include completing the PRACH procedure using channels based on the beam (block 1030). For example, UE 110 may be configured to apply the beam associated with the PRACH procedure to a subset of, or all, DL and/or UL channels (e.g., a PDCCH, PDSCH, SRS, PUCCH, PUSCH, etc.) used to communicate with base station 122 during the PRACH procedure, and base station 122 may be configured to identify or determine the channels, or subsets, and use them to communicate with UE 110 and complete the PRACH procedure.

Process 1000 may include communicating, after the PRACH procedure and in accordance with a beam management scheme, TCI information to reset the beam (block 1040). For example, after the PRACH procedure is compete, base station 122 may communicate TCI information to cause UE 110 to reset the beam to different CORESETs or connections (e.g., other than those used for the PRACH procedure). In some implementations, base station 122 may be configured to do so in accordance with a beam management scheme implemented by UE 110.

As described herein, the beam management scheme may include techniques described above with one or more of FIGS. 3-9, which may include, for example, communicating TCI information after expiration of a pre-determined amount of time, slots, or symbols after the PRACH procedure is completed. In some implementations, base statin 122 may be configured to determine which beam management scheme is being implemented by UE 110. In some implementations, this may be based on instructions (e.g., an RRC message, MAC CE, DCI, or PRACH message) provided to UE 110 by base station 122. Additionally, or alternatively, this may be based on an indication (e.g., an RRC message, PRACH message, etc.) provided by UE 110 to base station 122. Additionally, or alternatively, this may be based on a type of PRACH procedure being implemented (e.g., a CBRA procedure, CFRA procedure, a scheduling request, etc.). Additionally, or alternatively, this may be based on a signal or signal type associated with the PRACH procedure (e.g., a DL RS associated with the PRACH procedure, whether the PRACH procedure is associated with CSI-RS).

Figure 11:
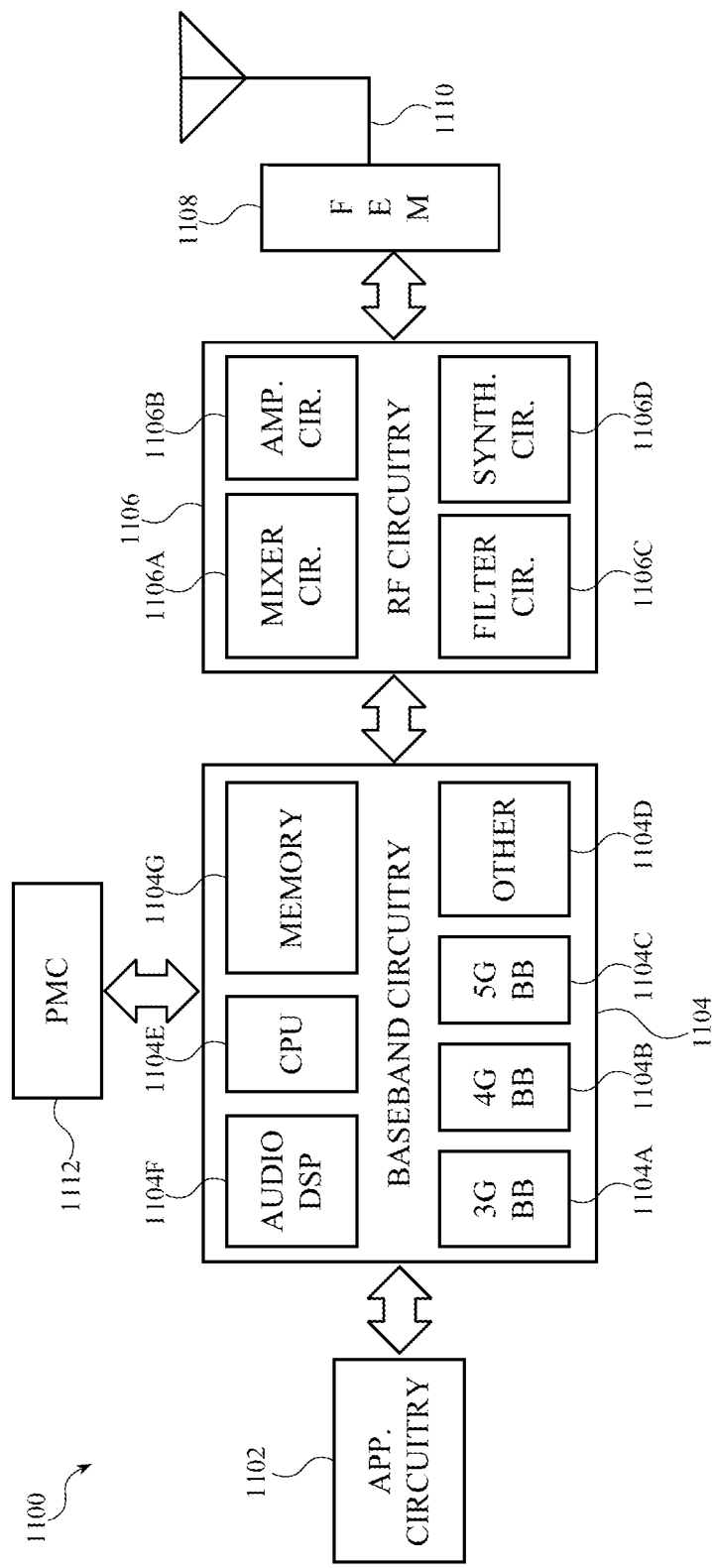
FIG. 11 is a diagram of an example of components of a device according to one or more implementations described herein.

FIG. 11 is a diagram of an example of components of a device according to one or more implementations described herein. In some implementations, the device 1100 can include application circuitry 1102, baseband circuitry 1104, RF circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some implementations, the device 1100 can include fewer elements (e.g., a RAN node may not utilize application circuitry 1102, and instead include a processor/controller to process IP data received from a CN such as 5GC 130 or an Evolved Packet Core (EPC)). In some implementations, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other implementations, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some implementations, processors of application circuitry 1102 can process IP data packets received from an EPC.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some implementations, the baseband circuitry 1104 can include a 3G baseband processor 1104A, a 4G baseband processor 1104B, a 5G baseband processor 1104C, or other baseband processor(s) 1104D for other existing generations, generations in development or to be developed in the future (e.g., 2G, 6G, etc.). The baseband circuitry 1104 (e.g., one or more of baseband processors 1104A-D) can handle various radio control functions that enable communication with one or more radio networks via the RF circuitry 1106. In other implementations, some or all of the functionality of baseband processors 1104A-D can be included in modules stored in the memory 1104G and executed via a Central Processing Unit (CPU) 1104E. The radio control functions can include, but are not limited to, signal modulation/demodulation, encoding/decoding, radio frequency shifting, etc. In some implementations, modulation/demodulation circuitry of the baseband circuitry 1104 can include Fast-Fourier Transform (FFT), preceding, or constellation mapping/de-mapping functionality. In some implementations, encoding/decoding circuitry of the baseband circuitry 1104 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1104 can include one or more audio digital signal processor(s) (DSP) 1104F. The audio DSPs 1104F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1104 and the application circuitry 1102 can be implemented together such as, for example, on a system on a chip (SOC).

In some implementations, the baseband circuitry 1104 can provide for communication compatible with one or more radio technologies. For example, in some implementations, the baseband circuitry 1104 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various implementations, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some implementations, the receive signal path of the RF circuitry 1106 can include mixer circuitry 1106A, amplifier circuitry 1106B and filter circuitry 1106C. In some implementations, the transmit signal path of the RF circuitry 1106 can include filter circuitry 1106C and mixer circuitry 1106A. RF circuitry 1106 can also include synthesizer circuitry 1106d for synthesizing a frequency for use by the mixer circuitry 1106A of the receive signal path and the transmit signal path. In some implementations, the mixer circuitry 1106A of the receive signal path can be configured to down-convert RF signals received from the FEM circuitry 1108 based on the synthesized frequency provided by synthesizer circuitry 1106D. The amplifier circuitry 1106B can be configured to amplify the down-converted signals and the filter circuitry 1106C can be a low-pass filter (LPF) or band-pass filter (BPF) configured to remove unwanted signals from the down-converted signals to generate output baseband signals. Output baseband signals can be provided to the baseband circuitry 1104 for further processing. In some implementations, the output baseband signals can be zero-frequency baseband signals, although this is not a requirement. In some implementations, mixer circuitry 1106A of the receive signal path can comprise passive mixers, although the scope of the implementations is not limited in this respect.

In some implementations, the mixer circuitry 1106A of the transmit signal path can be configured to up-convert input baseband signals based on the synthesized frequency provided by the synthesizer circuitry 1106D to generate RF output signals for the FEM circuitry 1108. The baseband signals can be provided by the baseband circuitry 1104 and can be filtered by filter circuitry 1106c.

In some implementations, the mixer circuitry 1106A of the receive signal path and the mixer circuitry 1106A of the transmit signal path can include two or more mixers and can be arranged for quadrature down conversion and up conversion, respectively. In some implementations, the mixer circuitry 1106A of the receive signal path and the mixer circuitry 1106A of the transmit signal path can include two or more mixers and can be arranged for image rejection (e.g., Hartley image rejection). In some implementations, the mixer circuitry 1106A of the receive signal path and the mixer circuitry 1106A can be arranged for direct down conversion and direct up conversion, respectively. In some implementations, the mixer circuitry 1106A of the receive signal path and the mixer circuitry 1106A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1106 can include analog-to-digital converter (ADC) and digital-to-analog converter (DAC) circuitry and the baseband circuitry 1104 can include a digital baseband interface to communicate with the RF circuitry 1106.

In some dual-mode implementations, a separate radio IC circuitry can be provided for processing signals for each spectrum, although the scope of the implementations is not limited in this respect.

In some implementations, the synthesizer circuitry 1106$d$ can be a fractional-N synthesizer or a fractional N/N+1 synthesizer, although the scope of the implementations is not limited in this respect as other types of frequency synthesizers can be suitable. For example, synthesizer circuitry 1106$d$ can be a delta-sigma synthesizer, a frequency multiplier, or a synthesizer comprising a phase-locked loop with a frequency divider.

The synthesizer circuitry 1106$d$ can be configured to synthesize an output frequency for use by the mixer circuitry 1106A of the RF circuitry 1106 based on a frequency input and a divider control input. In some implementations, the synthesizer circuitry 1106$d$ can be a fractional N/N+1 synthesizer.

In some implementations, frequency input can be provided by a voltage controlled oscillator (VCO), although that is not a requirement. Divider control input can be provided by either the baseband circuitry 1104 or the applications circuitry 1102 depending on the desired output frequency. In some implementations, a divider control input (e.g., N) can be determined from a look-up table based on a channel indicated by the applications circuitry 1102.

Synthesizer circuitry 1106$d$ of the RF circuitry 1106 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1106$d$ can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1106 can include an IQ/polar converter.

FEM circuitry 1108 can include a receive signal path which can include circuitry configured to operate on RF signals received from one or more antennas 1110, amplify the received signals and provide the amplified versions of the received signals to the RF circuitry 1106 for further processing. FEM circuitry 1108 can also include a transmit signal path which can include circuitry configured to amplify signals for transmission provided by the RF circuitry 1106 for transmission by one or more of the one or more antennas 1110. In various implementations, the amplification through the transmit or receive signal paths can be done solely in the RF circuitry 1106, solely in the FEM circuitry 1108, or in both the RF circuitry 1106 and the FEM circuitry 1108.

In some implementations, the FEM circuitry 1108 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1106). The transmit signal path of the FEM circuitry 1108 can include a power amplifier (PA) to amplify input RF signals (e.g., provided by RF circuitry 1106), and one or more filters to generate RF signals for subsequent transmission (e.g., by one or more of the one or more antennas 1110).

In some implementations, the PMC 1112 can manage power provided to the baseband circuitry 1104. In particular, the PMC 1112 can control power-source selection, voltage scaling, battery charging, or DC-to-DC conversion. The PMC 1112 can often be included when the device 1100 is capable of being powered by a battery, for example, when the device is included in a UE. The PMC 1112 can increase the power conversion efficiency while providing desirable implementation size and heat dissipation characteristics.

While FIG. 11 shows the PMC 1112 coupled only with the baseband circuitry 1104. However, in other implementations, the PMC 1112 may be additionally or alternatively coupled with, and perform similar power management operations for, other components such as, but not limited to, application circuitry 1102, RF circuitry 1106, or FEM circuitry 1108.

In some implementations, the PMC 1112 can control, or otherwise be part of, various power saving mechanisms of the device 1100. For example, if the device 1100 is in an RRC_Connected state, where it is still connected to the RAN node as it expects to receive traffic shortly, then it can enter a state known as Discontinuous Reception Mode (DRX) after a period of inactivity. During this state, the device 1100 can power down for brief intervals of time and thus save power.

If there is no data traffic activity for an extended period of time, then the device 1100 can transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1102 and processors of the baseband circuitry 1104 can be used to execute elements of one or more instances of a protocol stack. For example, processors of the baseband circuitry 1104, alone or in combination, can be used execute Layer 3, Layer 2, or Layer 1 functionality, while processors of the baseband circuitry 1104 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 12:
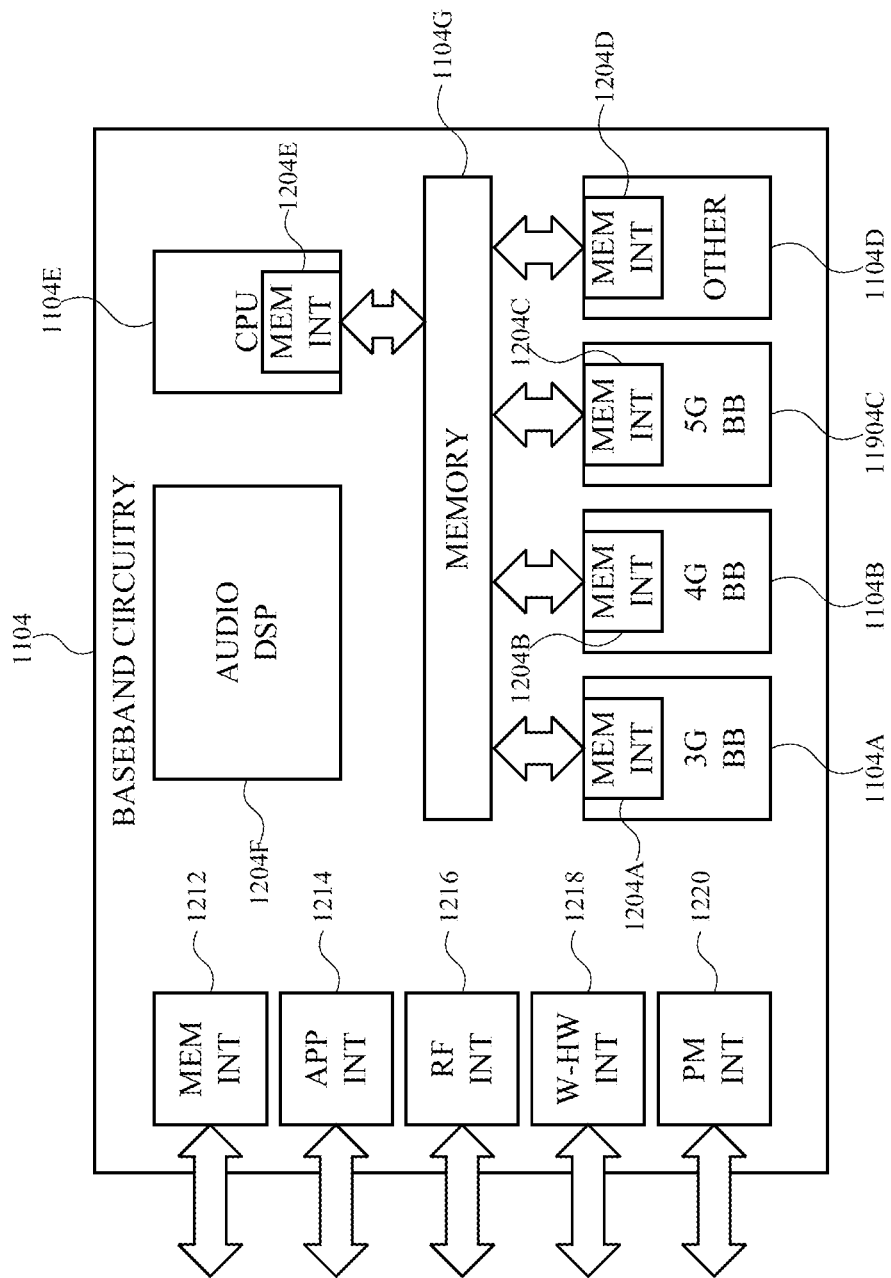
FIG. 12 is a diagram of example interfaces of baseband circuitry according to one or more implementations described herein.

FIG. 12 is a diagram of example interfaces of baseband circuitry according to one or more implementations described herein. As discussed above, the baseband circuitry 1104 of FIG. 11 can comprise processors 1104A-1104E and a memory 1104G utilized by said processors. Each of the processors 1104A-1104E can include a memory interface, 1204A-1204E, respectively, to send/receive data to/from the memory 1104G.

The baseband circuitry 1104 can further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a baseband processor of a user equipment (UE) may include one or more processors configured to: communicate, to a base station, a physical random access channel (PRACH) message to initiation a PRACH procedure; apply a beam, associated with the PRACH message, to all channels associated with the base station; detect, after completion of a PRACH procedure, a trigger for resetting the beam; and reset the beam to different channels based on transmission configuration indication (TCI) information received from the base station. In example 2, the channels comprise a physical downlink control channel (PDCCH), a physical downlink shared channel (PDSCHs), a physical uplink control channel (PUCCHs), an a physical uplink shared channel).

In example 3, the trigger comprises K symbols measured from a completion of the PRACH procedure. In example 4, the K symbols is determined based on a subcarrier spacing of a downlink (DL) bandwidth part (BWP) or an uplink (UL) BWP. In example 5, the K symbols is determined based on a minimal subcarrier spacing between a DL BWP and an UL BWP. In example 6, the channels correspond to at least one of: a single component carrier (CC); multiple CCs of a single band; or multiple CCs of band group. In example 7, the beam is applied to the channels based on at least one of: a capability of the UE; or higher layer signaling from the base station.

In example 8, the trigger comprises receiving the TCI information from the base station after completion of the PRACH procedure. In example 9, the one or more processors is further to: receive, during the PRACH procedure, additional TCI information corresponding to an additional base station; and maintain, during the PRACH produced, an additional beam based on the additional TCI information for the additional base station. In example 10, the one or more processors is further to: receive, from the base station via higher layer signaling, information associating the base station with the channels, the information comprising a cell identifier and a TCI state of the channels.

In example 11, the PRACH procedure is associated with a channel state information reference signal (CSI-RS); and the one or more processors is further to receive, from the base station, information associating the TCI information with the CSI-RS. In example 12, the one or more processors is further to: determine the trigger for resetting the beam based on at least one of: a radio access procedure type of the PRACH procedure, a reference signal type associated with the PRACH procedure; and signaling from the base station. In example 13, the radio access procedure type comprises whether the PRACH involves a scheduling request; the reference signal type comprises a CSI-RS; and the signaling from the base station comprises at least one of: a radio resource control (RRC) message; or a 1-bit indicator of a PRACH message.

In example 14, a baseband processor of a base station may include one or more processors configured to: receive a physical random access channel (PRACH) message from a user equipment (UE), the PRACH message initiating a PRACH procedure between the base station and the UE; determine a beam, used by the UE, to communicate the PRACH message; communicate, with the UE to complete the PRACH procedure, using channels based on the beam; and communicate, after the PRACH procedure, transmission configuration indication (TCI) information to cause the UE to reset the beam to different channels based on the TCI information. In example 15, the channels comprise a physical downlink control channel (PDCCH), a physical downlink shared channel (PDSCHs), a physical uplink control channel (PUCCHs), an a physical uplink shared channel), and/or the one or more processors are to: communicate with the UE using the different channels after K symbols measured from a completion of the PRACH procedure. In example 16, the K symbols is determined based on a subcarrier spacing of a downlink (DL) bandwidth part (BWP) or an uplink (UL) BWP. In example 18, the K symbols is determined based on a minimal subcarrier spacing between a DL BWP and an UL BWP.

In example 19, the TCI information is provided to the UE prior to reception of the PRACH message initiating the PRACH procedure. In example 20, the TCI information is provided to the UE after completion of the PRACH procedure. In example 21, the one or more processors is further to: transmit, to the UE via higher layer signaling, information associating the base station with the channels, the information comprising a cell identifier and a TCI state of the channels. In example 22, a method that includes any action or combination of actions as substantially described herein in the Detailed Description or any combination of the Figures.

In example 23, a user equipment (UE) configured to perform any action or combination of actions as substantially described herein in the Detailed Description or any combination of the Figures. In example 24, a base station configured to perform any action or combination of actions as substantially described herein in the Detailed Description or any combination of the Figures In example 25, a non-transitory computer-readable medium that stores instructions that, when executed, cause the performance of any action or combination of actions as substantially described herein in the Detailed Description or any combination of the Figures.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor of a user equipment (UE), configured to perform operations comprising:
    receiving, from a base station, transmission configuration indication (TCI) information that indicates a first beam as being associated with a channel;
    causing transmission of a physical random access channel (PRACH) message to the base station on a second beam to initiate a PRACH procedure, wherein the second beam is different than the first beam;
    during the PRACH procedure, communicating on the channel using the second beam;
    detecting, after completion of the PRACH procedure, a trigger for resetting the beam associated with the channel, wherein the trigger comprises K symbols measured from a completion of the PRACH procedure, further wherein K is determined based on a subcarrier spacing of a downlink bandwidth part (DL BWP) or uplink bandwidth part (UL BWP); and
    resetting the beam associated with the channel based on the trigger and the TCI information received from the base station.

2. The baseband processor of claim 1, wherein the operations comprise detecting the trigger based on whether a first condition is met or a second condition is met, and wherein
    in response to the first condition being met, the trigger comprises the K symbols; and
    in response to the second condition being met, the trigger comprises receiving transmission configuration indication (TCI) information after completion of the PRACH procedure.

3. The baseband processor of claim 2, wherein the first condition comprises the PRACH procedure being associated with a channel state information reference signal (CSI-RS).

4. The baseband processor of claim 2, wherein the operations comprise determining whether the first condition or the second condition is met based on an indication in a PRACH procedure message received from the base station.

5. The baseband processor of claim 1, wherein a beam associated with the PRACH procedure is applied during the PRACH procedure based on at least one of:
    a capability of the UE; or
    higher layer signaling from the base station.

6. The baseband processor of claim 2, wherein the operations further comprise:
    determining whether the first condition or the second condition is met based on
        a radio access procedure type of the PRACH procedure.

7. The baseband processor of claim 6, wherein:
    the radio access procedure type comprises whether the PRACH procedure involves a scheduling request.

8. The baseband processor of claim 1, wherein:
    the PRACH procedure is associated with a channel state information reference signal (CSI-RS); and
    the operations further comprise receiving, from the base station, information associating the TCI information with the CSI-RS.

9. The baseband processor of claim 1, wherein the operations further comprise:
  receiving, via higher layer signaling, information associating the base station with the channels, the information comprising a cell identifier and a TCI state of the channels.

10. The baseband processor of claim 1, wherein the operations comprise communicating on all channels associated with the base station using the second beam during the PRACH procedure.

11. A baseband processor of a user equipment (UE), configured to perform operations comprising:
  receiving, from a base station, transmission configuration indication (TCI) information that indicates that a first beam being associated with a channel;
  causing transmission of a physical random access channel (PRACH) message to the base station on a second beam to initiate a PRACH procedure, wherein the second beam is different than the first beam;
  during the PRACH procedure, communicating on the channel using the second beam:
  receiving additional TCI information corresponding to an additional base station;
  maintaining, during the PRACH procedure, an additional beam based on the additional TCI information for the additional base station;
  detecting, after completion of the PRACH procedure, a trigger for resetting the beam associated with the channel; and
  resetting the beam associated with the channel based on the trigger and the TCI information received from the base station.

12. The baseband processor of claim 11, wherein the operations further comprise:
  receiving, from the base station via higher layer signaling, the additional TCI information comprising a cell identifier and a TCI state.

13. The baseband processor of claim 11, wherein the operations comprise communicating on all channels associated with the base station using the second beam during the PRACH procedure.

14. An apparatus of a base station, comprising one or more processors configured to perform operations comprising:
  transmitting transmission configuration indication (TCI) information that indicates a first beam as being associated with a channel;
  receive a physical random access channel (PRACH) message from a user equipment (UE) on a second beam, the PRACH message initiating a PRACH procedure between the base station and the UE, wherein the second beam is different than the first beam;
  communicate on the channel with the UE during the PRACH procedure using the second beam the beam;
  when a first condition is met communicate on the channel with the UE using the first beam after K symbols measured from completion of the PRACH procedure, wherein K is determined based on a subcarrier spacing of a DL BWP or UL BWP; and
  when a second condition is met, communicate, after the PRACH procedure, new TCI information to cause the UE to reset a beam associated with the channel based on the new TCI information.

15. The apparatus of claim 14, wherein the channels comprise a physical downlink control channel (PDCCH), a physical downlink shared channel (PDSCH), a physical uplink control channel (PUCCH), or a physical uplink shared channel (PUSCH).

16. The apparatus of claim 14, wherein the first condition comprises the PRACH procedure being associated with a channel state information reference signal (CSI-RS).

17. The apparatus of claim 14, wherein the operations comprise determining whether the first condition or the second condition is met based on an indication in a PRACH procedure message transmitted to the UE.

18. The apparatus of claim 14, wherein the operations further comprise determining whether the first condition or the second condition is met based on a radio access procedure type of the PRACH procedure.

* * * * *